(12) United States Patent
Corman et al.

(10) Patent No.: US 8,918,540 B2
(45) Date of Patent: Dec. 23, 2014

(54) UNMANNED AIR VEHICLE INTEROPERABILITY AGENT

(75) Inventors: David E. Corman, Creve Coeur, MO (US); Thomas S. Herm, Frontenac, MO (US); Steven A. Dorris, O'Fallon, MO (US); Eric J. Martens, Crestwood, MO (US); James L. Paunicka, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 2152 days.

(21) Appl. No.: 11/235,626

(22) Filed: Sep. 26, 2005

(65) Prior Publication Data

US 2007/0235584 A1    Oct. 11, 2007

(51) Int. Cl.
  *G06F 15/16*   (2006.01)
  *H04L 29/06*   (2006.01)
  *H04L 29/08*   (2006.01)

(52) U.S. Cl.
  CPC .............. *H04L 67/125* (2013.01); *H04L 69/08* (2013.01)
  USPC .............................. 709/246; 341/50; 708/204

(58) Field of Classification Search
  CPC .............................. H04L 67/125; H04L 69/08
  USPC .......................................................... 709/246
  See application file for complete search history.

(56) References Cited

U.S. PATENT DOCUMENTS

| 7,408,898 B1 * | 8/2008 | Brown ........................... 370/328 |
| 2005/0004723 A1 * | 1/2005 | Duggan et al. ................... 701/24 |
| 2005/0131933 A1 * | 6/2005 | Jha ................................ 707/102 |
| 2006/0271248 A1 * | 11/2006 | Cosgrove et al. ................. 701/2 |

FOREIGN PATENT DOCUMENTS

| DE | 10059948 | 6/2002 |
| EP | 1349024 | 10/2003 |
| WO | WO 0304882 | 5/2003 |
| WO | WO 2006/099100 | 9/2006 |

OTHER PUBLICATIONS

Caruso, A., "Tactical control system (TCS) for unmanned air vehicles (UAVs)", 2002, Proceedings of SPIE vol. 4824, pp. 118-124 retrieved from http://scitation.aip.org/getpdf/servlet/GetPDFServlet?filetype=pdf&id=PSISDG004824000001000118000001&idtype=cvips&prog=normal on Dec. 1, 2008.*

Caruso, A., "Tactical control system (TCS) for unmanned air vehicles (UAVs)", 2002, Proceedings of SPIE vol. 4824, pp. 118-124 retrieved from http://scitation.aip.org/getpdf/servlet/GetPDFServlet?filetype=pdf&id=PSISDG004824000001000118000001&idtype=cvips&prog=normal on De. 1, 2008.*

(Continued)

*Primary Examiner* — Jude Jean Gilles
*Assistant Examiner* — Jaren M Means

(57) ABSTRACT

A method of coordinating communications between a plurality of Unmanned Air Vehicles (UAVs) operating in connection with differing communication languages. A common language is provided which includes common language commands and common language data objects. Common language commands are communicated from a user to a plurality of UAVs through a UAV Interoperability Agent (UIA), which converts the common language commands to UAV-specific commands which can be understood by the specific UAV. Additionally, UAVs send data in a native platform format to the UIA, which converts the native platform data to common language format for collection and interpretation by the user.

19 Claims, 9 Drawing Sheets

(56) References Cited

OTHER PUBLICATIONS

Voelling, P., "US Government Tactical UAV's and Common Systems: An approach to interoperability", 1998, Proceedings of RPV/UAV Systems, pp. 1.1-1.10.*

Cooke, C., "Interoperable Digital Data Links for Maritime Unmanned Air Vehicles", 1998, Proceedings of RPV/UAV Systems, pp. 15.1-15.8.*

Francl, M., "UAVs as Communications Routing Nodes", 2000, Proceedings of SPIE vol. 4127, pp. 40-45.*

* cited by examiner

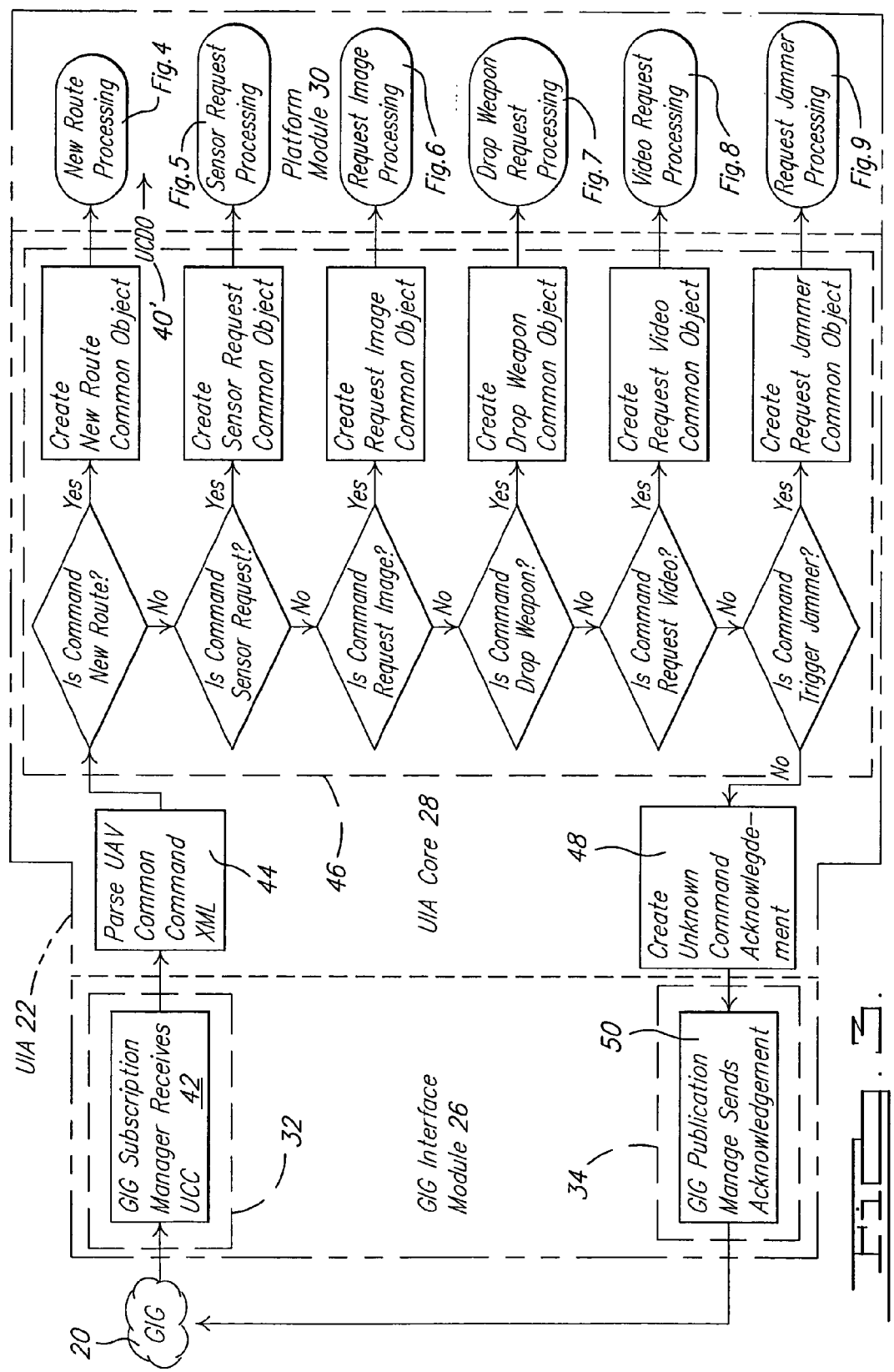

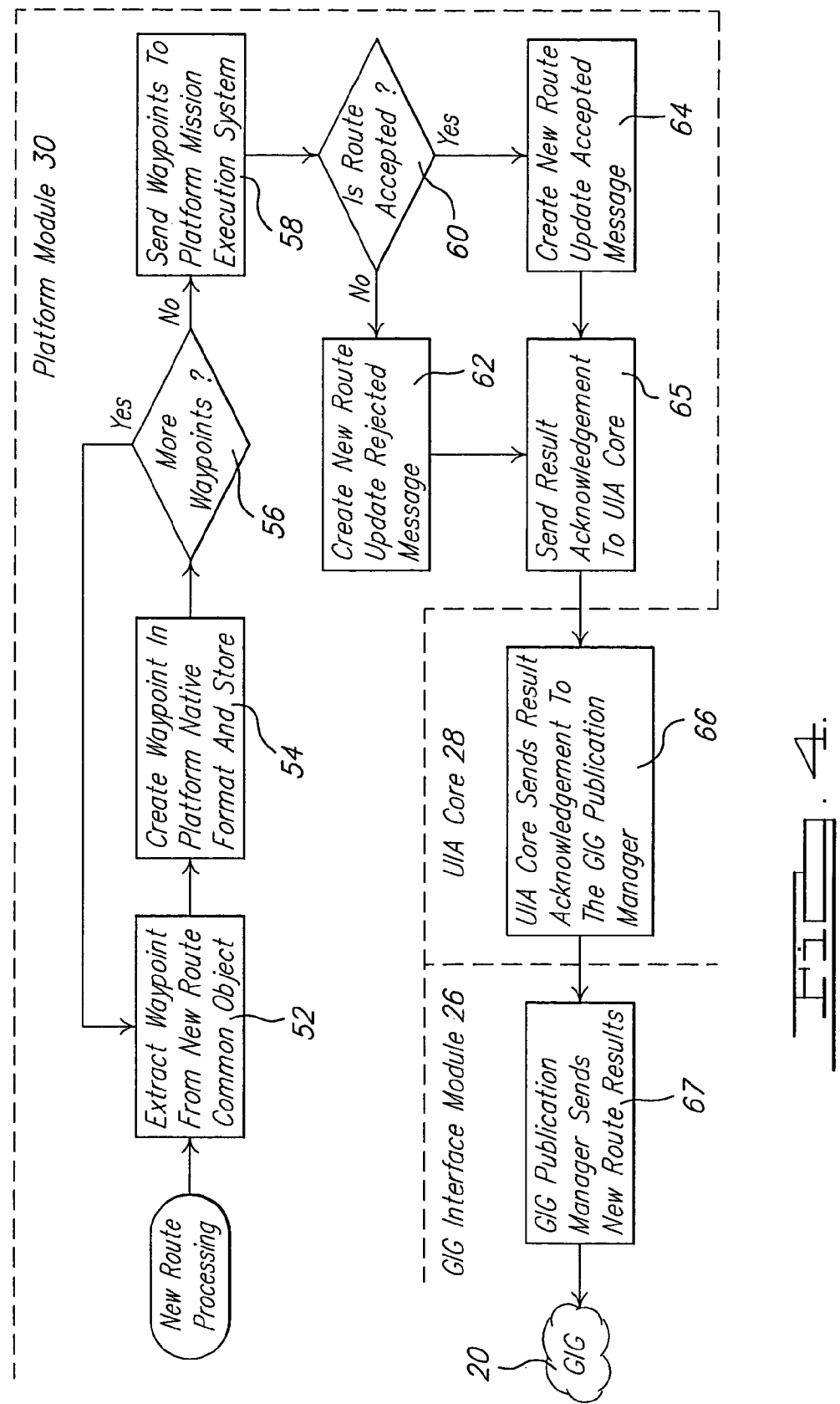

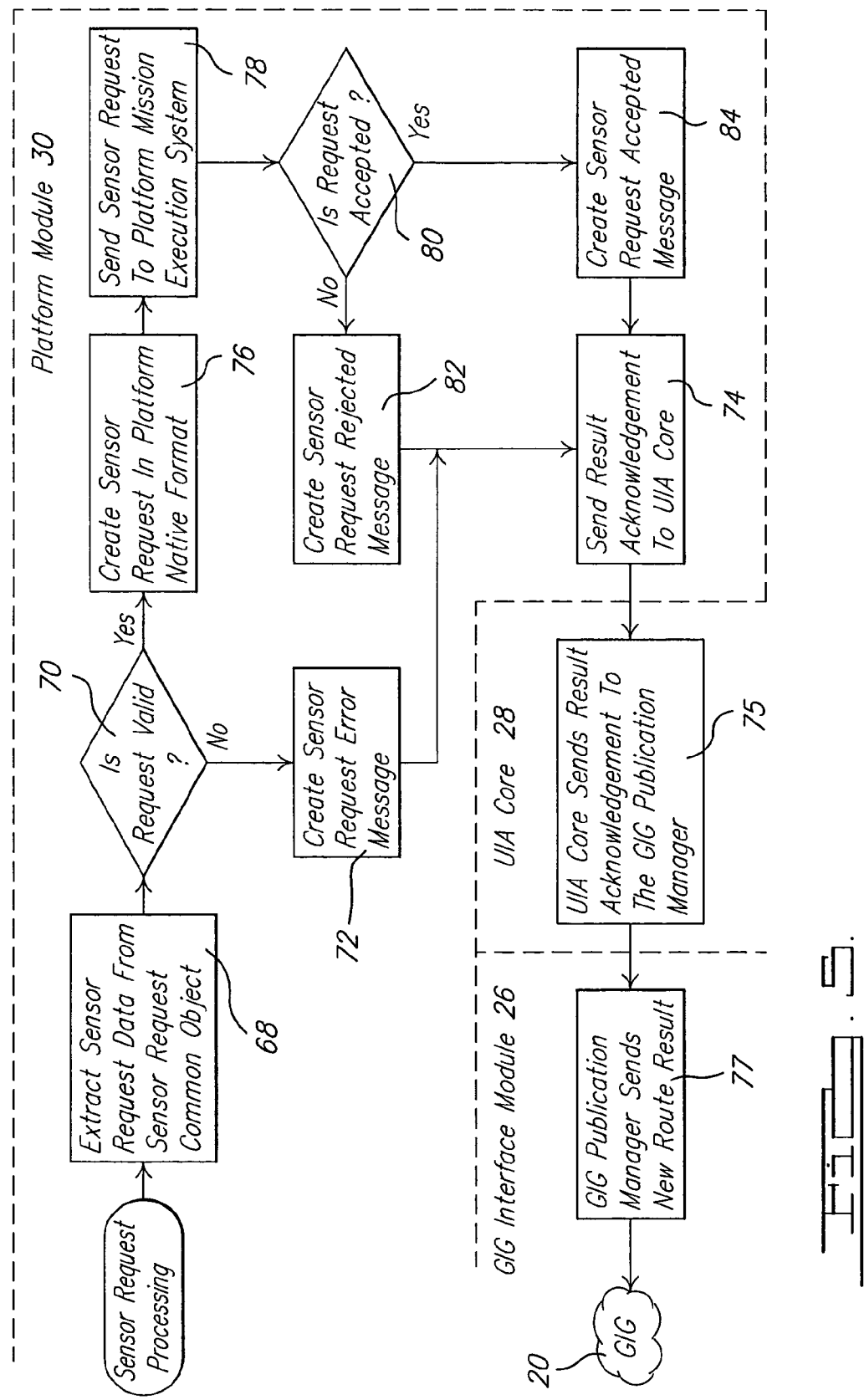

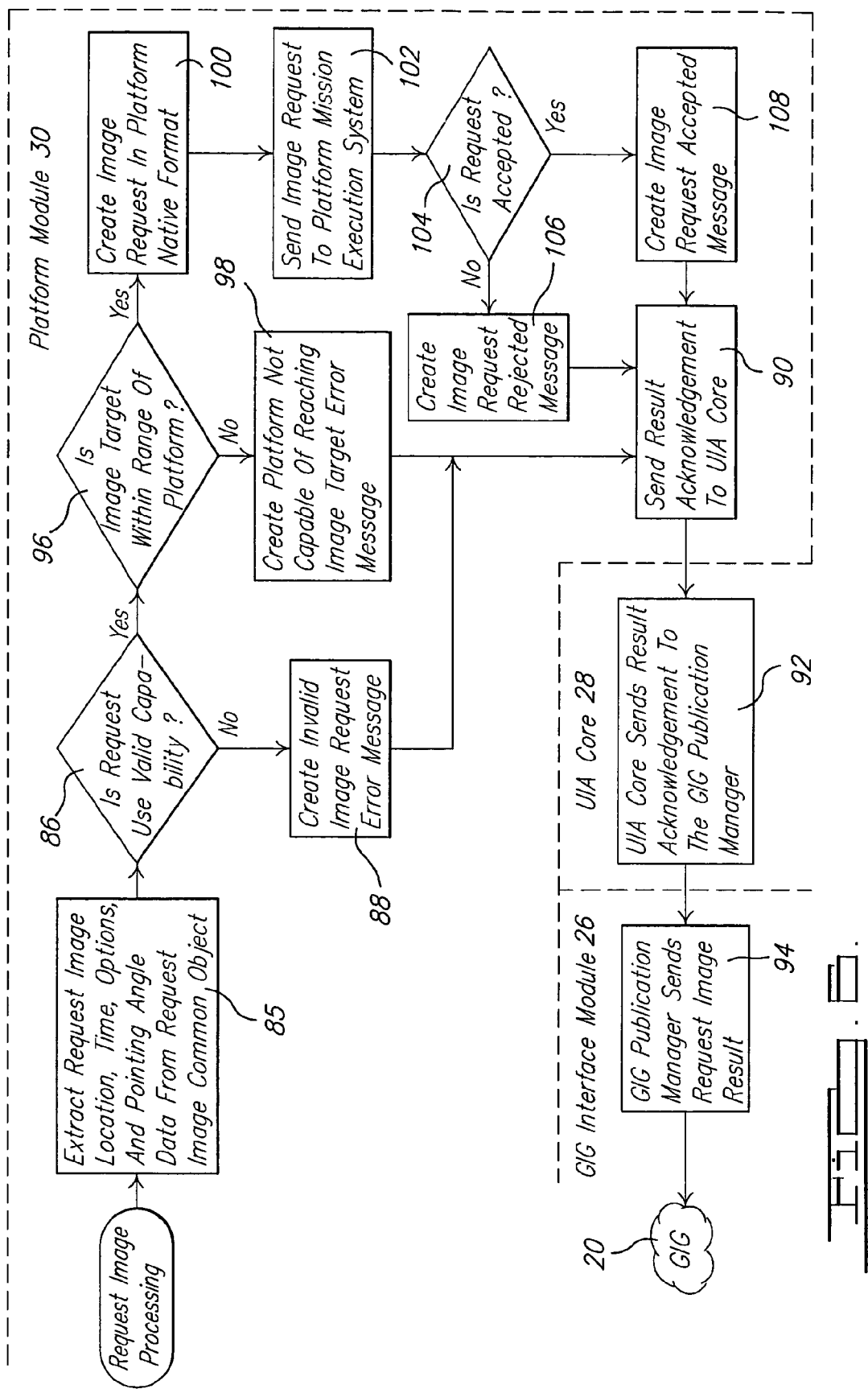

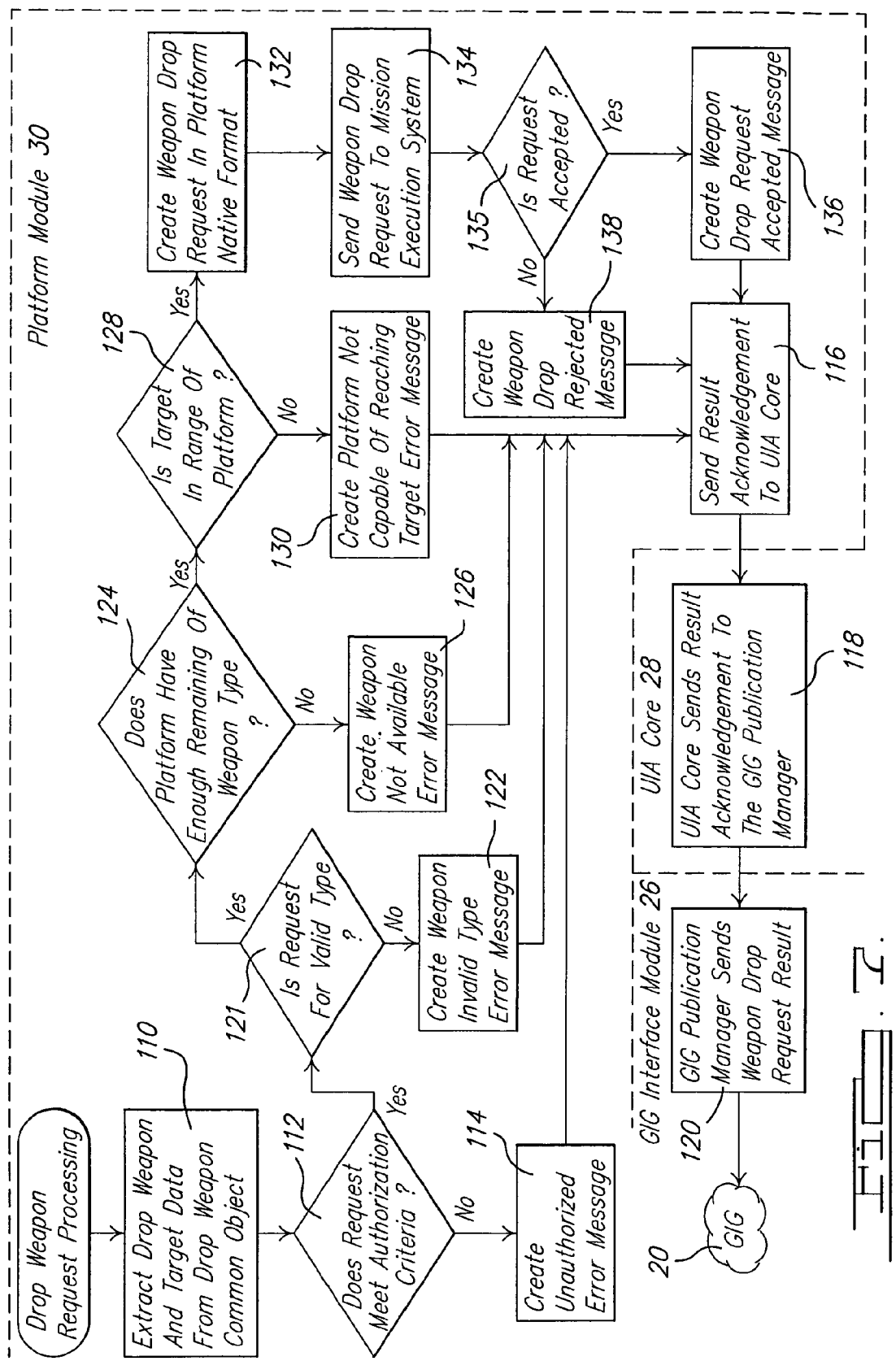

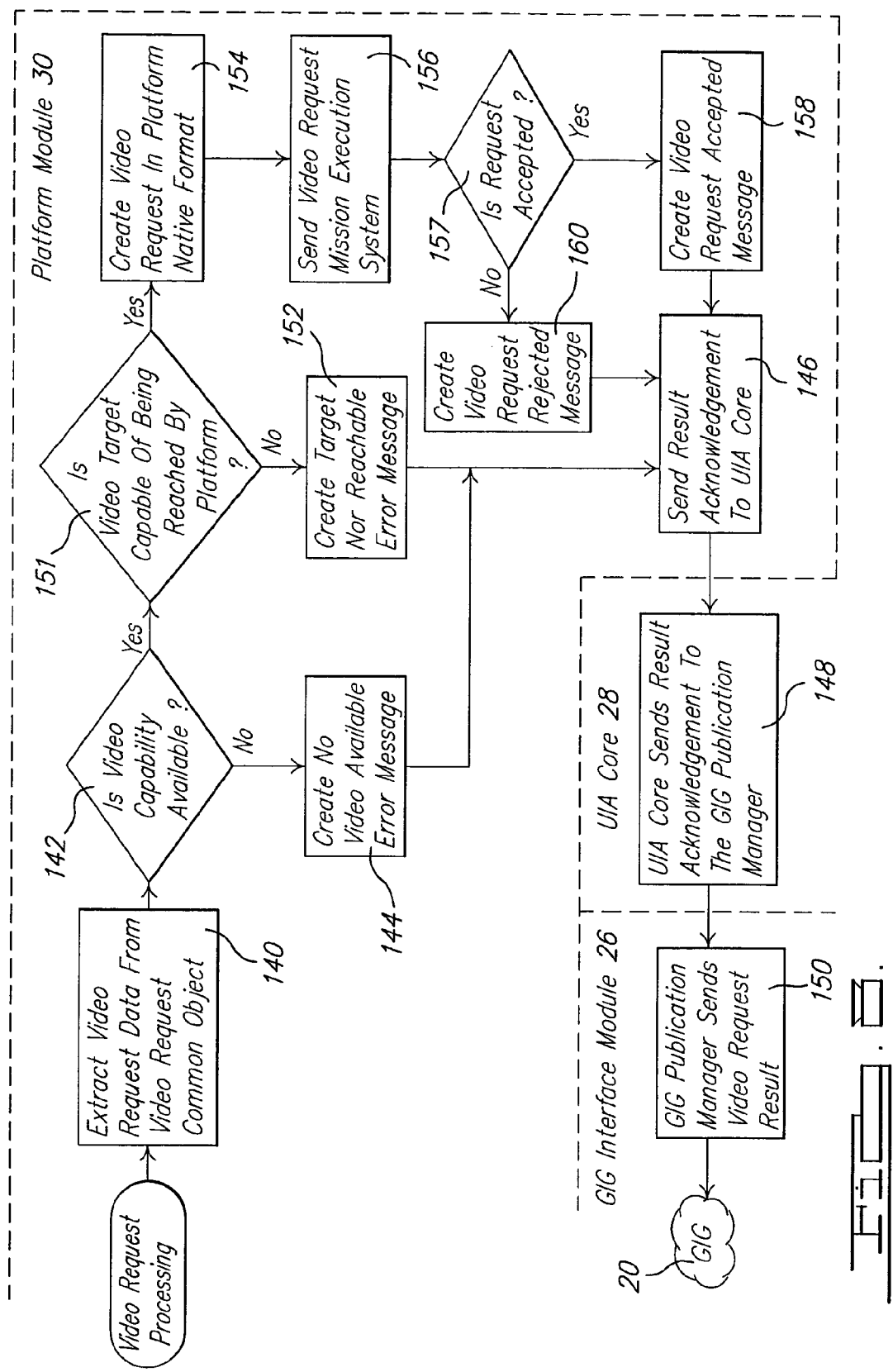

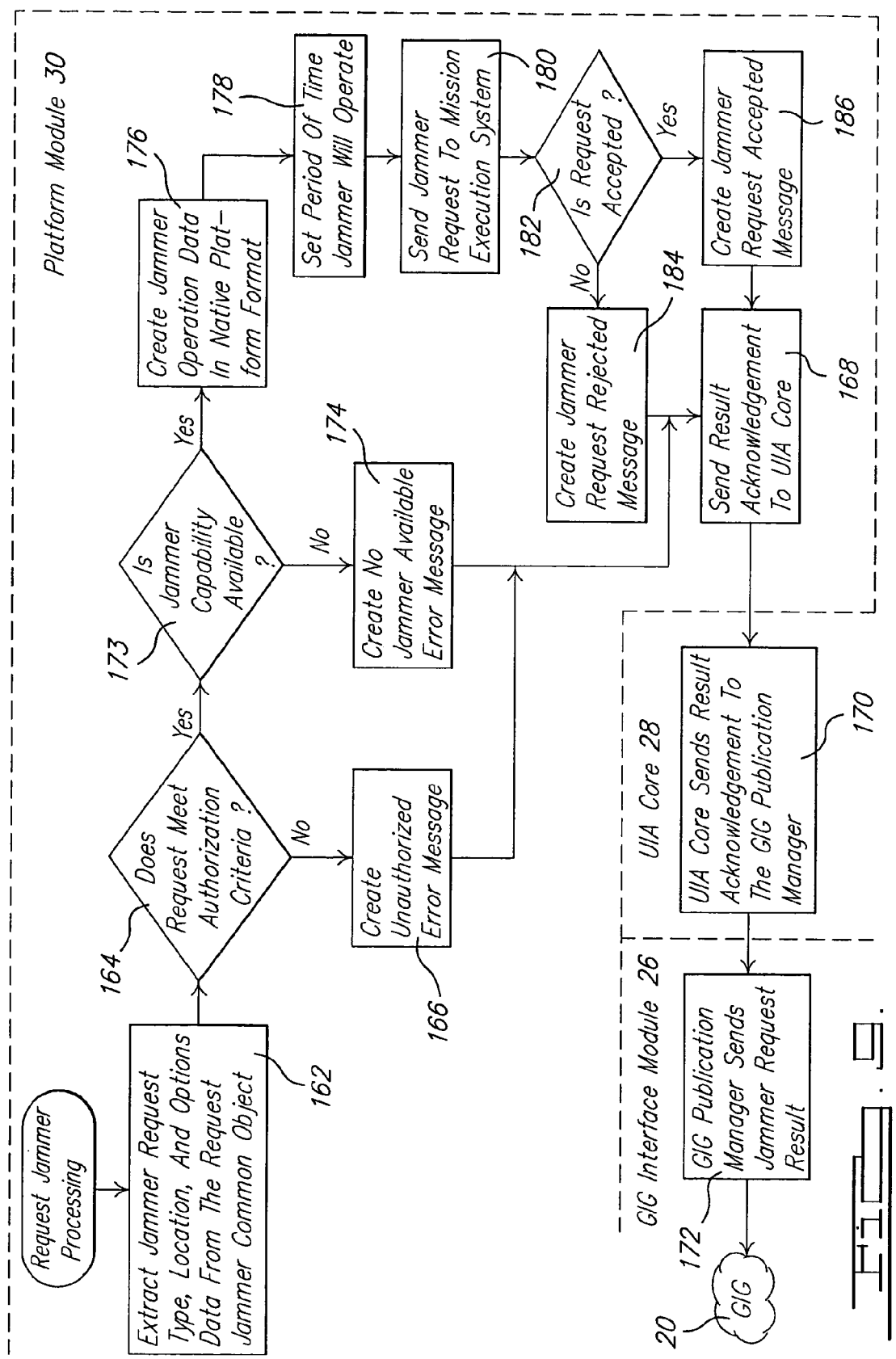

UNMANNED AIR VEHICLE INTEROPERABILITY AGENT

FIELD

The present disclosure relates to aircraft communication systems, and, more particularly, to a communication system for controlling unmanned aircraft vehicles.

BACKGROUND

A variety of Unmanned Air Vehicles (UAVs) have been developed by the United States and international partner militaries, with more currently under development. These diverse systems range from reconnaissance planes to combat-ready sensor and weapons platforms, and are being developed by various defense contractors and manufacturers. These UAVs have the potential to revolutionize defense measures by providing low cost means for carrying out military action without risking troops or aircrews.

These various and diverse UAVs must be integrated with each other in order to provide synchronized responses to the commands of military personnel. This is problematic due to the many different types of UAVs, and the number of manufacturers involved with producing these UAVs. The multitude of UAV configurations requires a method for communicating swiftly in a coordinated manner with the military personnel in control of the UAVs, and with each other.

As such, there is a need in the relevant art to provide a method of communicating with and coordinating the actions of military fleets comprised of UAVs having multiple and diverse configurations.

SUMMARY

The present disclosure relates to a method and apparatus for communicating with and receiving data from a plurality of UAVs in a coordinated manner. Further, a common language is provided which allows for communication between the various types and configurations of unmanned air vehicles and a single user or command personnel. A control device is provided for the user or command personnel. The control device is in communication with an interoperability agent, which is in further communication with the plurality of UAVs.

In one preferred implementation, the user enters a common command, which is part of a common command language, to be carried out by the UAVs into the control device. These common commands may cover a wide variety of standard tasks for the plurality of UAVs, such as flying to a specific location, or utilizing weapons, sensors, or any other devices that may be aboard the UAV. The control device then forwards the common command to the interoperability agent. The standardized common commands are helpful due to the wide variety of platforms produced by the various UAV manufacturers. The interoperability agent then converts the common command to a UAV-specific command, and forwards the command to the proper UAV(s).

Data is transmitted from the UAV to the user in a similar fashion. The UAV first transmits a UAV-specific data object back to the interoperability agent. This UAV-specific data object may be data from the UAV requested by the user, a confirmation of commands the user sent to the UAV, or any other data that may be necessary for the UAV to transmit to the user. The interoperability agent converts the UAV-specific data object to a common language data object which can be understood by the control device and, subsequently, the user. The interoperability agent then forwards the converted data object to the control device for collection and interpretation by the user.

BRIEF DESCRIPTION OF THE DRAWINGS

The present disclosure will become more fully understood from the detailed description and the accompanying drawings, wherein:

FIG. 3 is a command process flowchart of a UAV communication system according to the principles of the present disclosure;

FIG. 4 is a New Route sub-chart for the command process flowchart of FIG. 3;

FIG. 5 is a Sensor Request sub-chart for the command process flowchart of FIG. 3;

FIG. 6 is an Image Request sub-chart for the command process flowchart of FIG. 3;

FIG. 7 is a Drop Weapon Request sub-chart for the command process flowchart of FIG. 3;

FIG. 8 is a Video Request sub-chart for the command process flowchart of FIG. 3; and FIG. 9 is a Jammer Request sub-chart for the command process flowchart of FIG. 3.

DETAILED DESCRIPTION

The following description of the various embodiment(s) is merely exemplary in nature and is in no way intended to limit the disclosure, its application, or uses.

Figure 1:
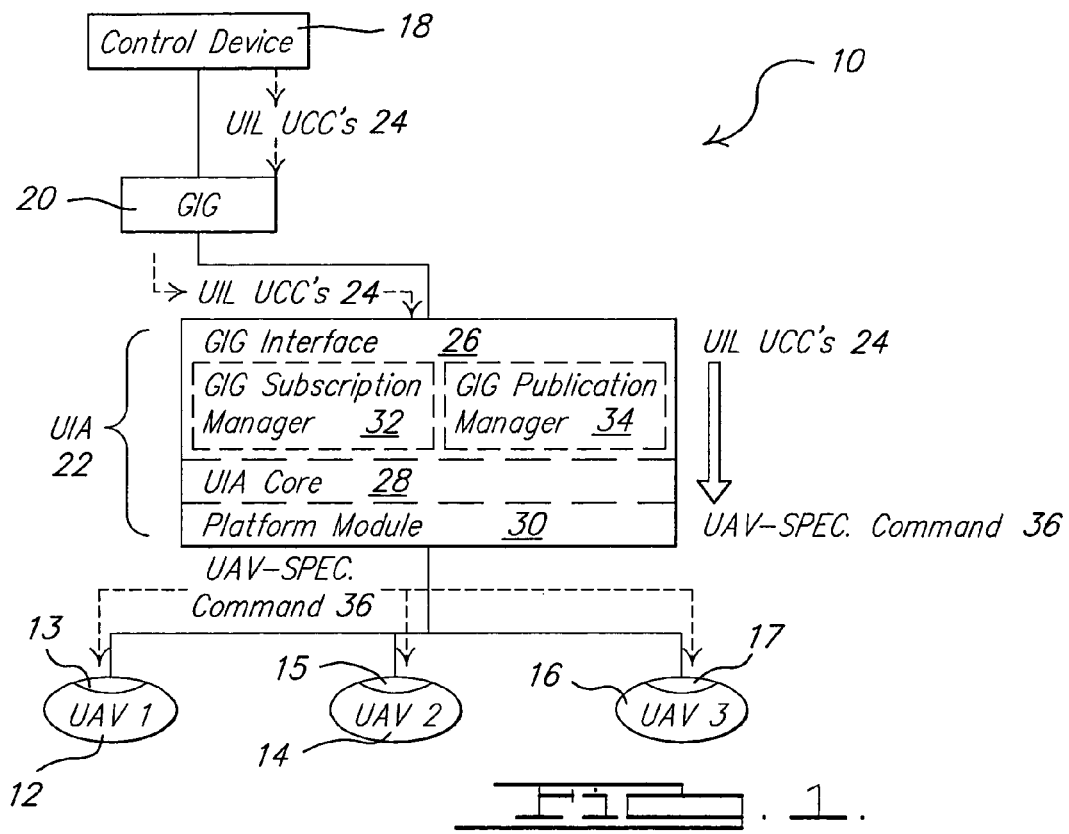
FIG. 1 is a schematic diagram of one embodiment of a forward/command link of a UAV communication system according to the principles of the present disclosure.

With reference to FIG. 1, a system 10 in accordance with one embodiment of the present disclosure is shown. The system 10 in FIG. 1 implements a forward/command link communication system, which provides synchronous control for a plurality of Unmanned Air Vehicles (UAVs) 12, 14, 16. Control device 18 is in communication with Global Information Grid (GIG) 20 via any means well known in the art, including a wireless connection. GIG 20 is in further communication with a translating subsystem commonly known as an Unmanned Air Vehicle "Interoperability Agent" (UIA) 22. UIA 22, in turn, communicates with the plurality of UAVs 12, 14, 16. Although three UAVs 12, 14, 16 are shown, it is to be understood that any number of UAVs may be in communication with UIA 22 without being beyond the scope of the present disclosure.

The universal commands and data which are sent between control device 18 and UAVs 12, 14, 16 are in accordance with a UAV Interoperability Language (UIL). The UIL is comprised of UIL Common Commands (UCCs) and UIL Common Data Objects (UCDOs). UCCs generally represent commands, while UCDOs represent data. The UIL provides a common means of communication between the user and the plurality of various UAV platforms and configurations so that various commands and data are communicated in a synchronized fashion, without interference or confusion between the various UAVs 12, 14 and 16. UCCs and UCDOs may be transmitted in either direction between control device 18 and UAVs 12, 14, 16. Although the specific examples contained herein illustrate the transmission of UCCs solely from control device 18 to UAVs 12, 14, 16, UCCs may also be transmitted from UAVs 12, 14, 16 to control device 18 as necessary for communication and coordination of UAVs 12, 14, 16. Likewise, although the examples contained herein illustrate UCDO transmission from UAVs 12, 14, 16 to control device 18, UCDOs may be transmitted from control device 18 to UAVs 12, 14, 16. As such, UCCs and UCDOs will generally be transmitted back and forth between control device 18 and UAVs 12, 14, 16, and are not limited to being transmitted solely in the directions specifically described herein.

A user (not shown) interfaces with control device 18 to input a command intended for one or more of the UAVs 12, 14, 16. This command may be any kind of command typically associated with the intended UAV platforms, such as a Sensor Request, Drop Weapon Request, or instruction to fly to a given location. Control device 18 subsequently sends this command to the UIA 22 in the form of a UIL Common Command (UCC).

Figure 1A:
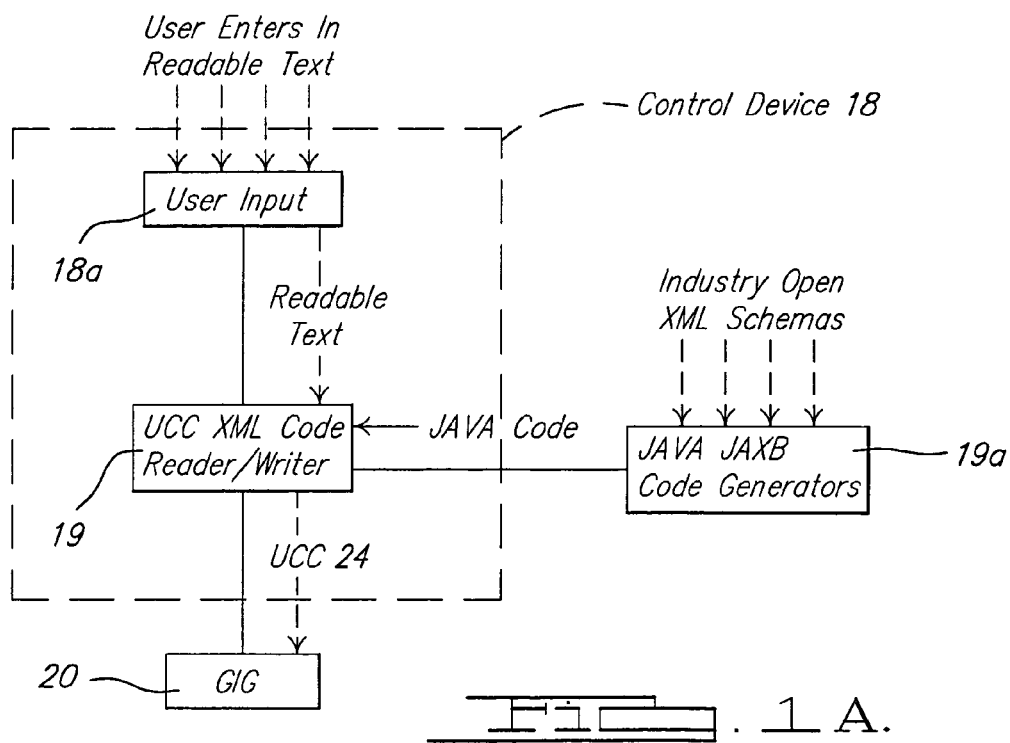
FIG. 1A is a schematic diagram of one embodiment of a user control device according to the principles of the present disclosure.

Turning to FIG. 1A, one embodiment of control device 18 which converts a readable text command into UCC 24 is shown. Control device 18 is comprised of user input 18*a* and UCC XML Code Reader/Writer 19. A system of UCC's which define the commands for the UAV system are preferably initially specified in an Industry Open XML Schema, which is input to, as an example, a Java JAXB code generator 19*a*. Java code that can create the predetermined number of UCC's from each readable text input is thus generated by Java JAXB schema generator 19*a*, and this code is input to the UCC XML Code Reader/Writer 19. Java JAXB code generator 19*a* may be disconnected once UCC XML Code Rerader/Writer 19 has been programmed with the java code. To execute a command, UCC XML Code Writer/Reader 19 generates UCC 24 from the readable text input from control device 18, using the java code. UCC 24 is then published to GIG 20.

UIA 22 is comprised of a GIG interface 26, UIA core 28, and platform module 30. GIG interface 26 is in direct communication with GIG 20 so as to be able to communicate commands and data bi-directionally between the GIG 20 and the GIG interface 26. GIG interface 26 is comprised of GIG subscription manager 32, which accesses data provided to GIG 20, and GIG publication manager 34, which publishes data to GIG 20 for communication to the user. GIG interface 26 allows for UIA 22 to be deployed in a variety of geographical locations where access to the GIG 20 is possible.

Generally, UIA 22 facilitates the exchange of commands and data between GIG 20 and the UAVs 12, 14, 16. The general methodology will now be first explained, with specific command examples following thereafter.

UCC 24 is received at GIG interface 26 and sent to UIA core 28. UIA core 28 coordinates all activities of UIA 22 and handles all interactions between GIG interface 26 and platform module 30. As such, UIA core 28 sends UCC 24 to platform module 30. Platform module 30 is configured to communicate with the one or more UAV platforms to which a particular UIA 22 is connected. Platform module 30 handles the transmission of information in the form of UCC 24, as an example, between UIA 22 and UAVs 12, 14, 16. Platform module 30 also allows for the physical or network connection between UIA 22 and UAVs 12, 14, 16. Once platform module 30 receives UCC 24, it converts or translates UCC 24 into one or more UAV-specific commands 36, which can be understood by UAVs 12, 14, 16. Since UAVs 12, 14, 16 may be configured differently or have different native languages, the conversion of UCC 24 to UAV-specific command 36 may be different for each of UAVs 12, 14, 16. UAV-specific command 36 is subsequently sent to a platform mission execution system 13, 15, 17 of UAVs 12, 14, 16, respectively. This transmission can be accomplished via a data link such as a wireless or network connection, or any other means convenient for sending data from UIA 22 to UAVs 12, 14, 16. Platform mission execution system 13, 15, 17 may be comprised of autonomous software onboard a complex UAV, or an operator station for a UAV that is primarily manually commanded by a user or command personnel.

The various UAVs 12, 14, 16 thus receive and carry out UAV-specific command 36. By converting UCC 24 into UAV-specific command 36, the various platforms and configurations of UAVs 12, 14, 16 can uniformly understand and synchronously carry out the commands of the user or military personnel.

Figure 2:
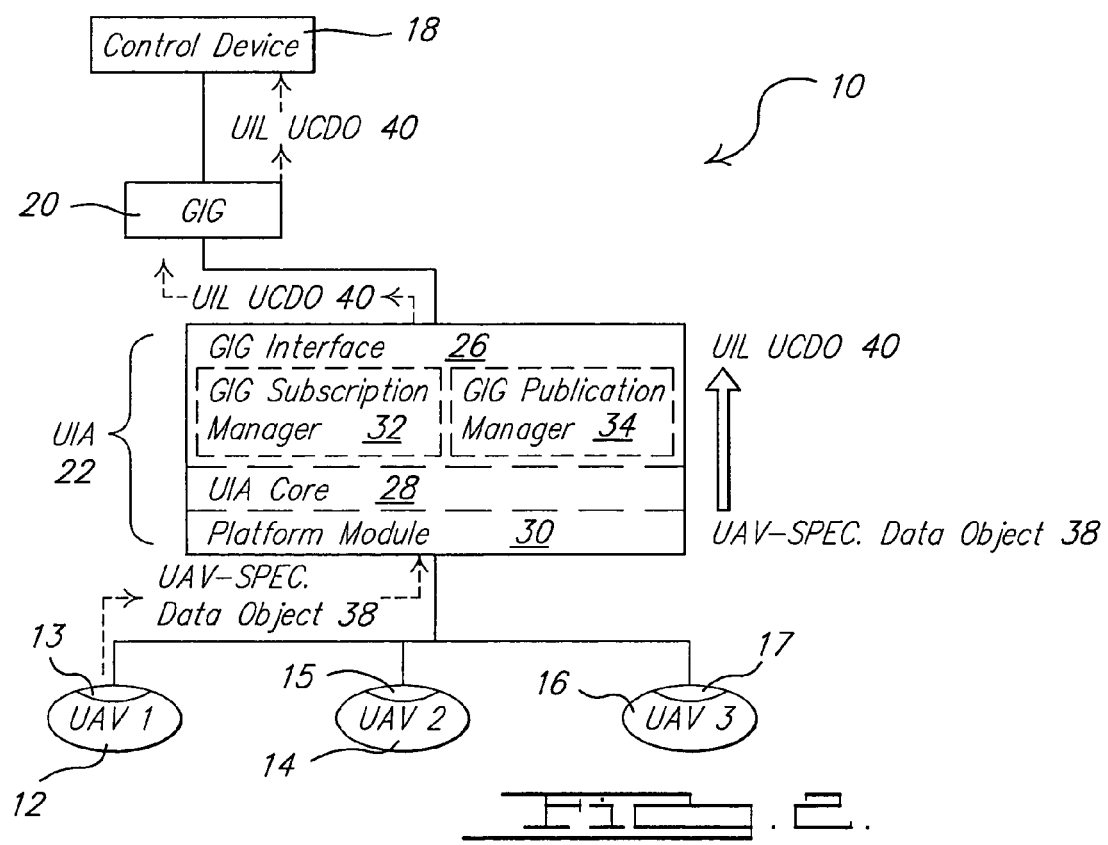

Turning now to FIG. 2, the system 10 is illustrated implementing a return/data link communication operation. The return/data communication operation provides, in addition to the control functions described above, a synchronized manner of assembling and collecting various data from the UAVs 12, 14, 16.

The UAVs 12, 14, 16 collect data and carry out commands according to the instructions provided by the user or command personnel, as described above. As these commands are carried out, UAVs 12, 14, 16 will collect data as the subject of those commands in the form of UAV-specific data objects 38. UAV-specific data objects 38 are generally in a format specific to each of the plurality of UAVs 12, 14, 16. In addition, UAVs 12, 14, 16 otherwise communicate with the user or command personnel in the form of UCCs or UCDOs in response to commands sent to UAVs 12, 14, 16 through the forward/command link operation illustrated in FIG. 1 as described above.

In this example, the UAVs 12, 14, 16 forward each UAV-specific data object 38 to UIA 22, where it is received at platform module 30. Platform module 30 converts or translates UAV-specific data object 38 from platform mission execution system 13, 15, 17 into a UAV interoperability language Uniform Common Data Object (UCDO) 40. Platform module 30 subsequently sends UCDO 40 to UIA core 28, which forwards UCDO 40 to GIG interface 26. GIG interface 26 forwards UCDO 40 to GIG 20 by way of GIG publication manager 34. GIG 20 subsequently forwards UCDO 40 to control device 18 for interpretation by the user or command personnel.

UIA 22 thus provides for the translation of UCCs 24 and UCDOs 40 between the control device 18 and the UAVs 12, 14, 16, such that the variety of configurations of UAVs can be synchronously deployed by a user or command personnel. UIA 22 converts all UAV-specific language objects to common language objects such that a single user can assimilate the various actions and reports of the UAVs 12, 14, 16.

UIA 22 can be used to distribute any type of command or data that could be associated with UAVs 12, 14, 16. Examples of several commands are provided herein, but are not to be construed as limiting the scope of the disclosure solely to the examples provided.

Turning now to FIG. 3, an exemplary command process flowchart of a UAV communication system according to the principles of the present disclosure is illustrated. UCC 24 is first sent to GIG 20 as described above, and is then forwarded on to GIG interface 26. As shown at operation 42, UCC 24 is received by GIG subscription manager 32 within GIG interface 26. UCC 24 is then forwarded on to UIA core 28, which parses UCC 24 at operation 44. Once UCC 24 is parsed it is sent along to an internal command query 46 where a series of decision operations determine what command is to be processed. Any number of commands typically carried out by a UAV may be part of internal command query 46, and the examples provided herein are not to be construed as limiting the scope of the present disclosure. Each possible command is queried sequentially, in any order as may be determined beneficial. Internal command query 46 is shown as having a first query for a New Route command. If the answer is positive (i.e., UCC 24 relates to a command for a new route for the UAV), a new UCDO 40' is sent along to platform module 30 for distribution to the plurality of UAVs 12, 14, 16. If the answer is negative, the next command is queried, until a positive answer is found. Should all command queries be negative, UIA core 28 creates an Unknown Command acknowledgement at operation 48, and GIG publication manager 34 publishes the acknowledgement for GIG 20 at operation 50. Virtually any form of command may be used with the UAVs 12, 14, 16.

In further explanation of the command examples that are provided, sub-charts of these commands are provided to explain the interaction of a UIA with a plurality of UAVs 12, 14, 16 (see FIGS. 1, 2) with more specificity. Turning to FIG. 4, a New Route sub-chart for the command process flowchart of FIG. 3 is illustrated. Whenever a New Route UCDO 40' is created by UIA 22 (see FIG. 3), it is forwarded on to the platform module 30 as described above. The waypoint is first extracted from UCDO 40' at operation 52, and is then converted to a UAV-specific format at operation 54. After more waypoints are queried at query operation 56, platform module 30 forwards the waypoints to the platform mission execution system(s) of the relevant UAV(s) at operation 58. The command can thus be coordinated amongst a plurality of different UAV configurations. After sending the waypoint data, query operation 60 checks whether the new route is accepted by the UAV 12. Thus, if the UAV 12 is disabled or otherwise unavailable, the route will not be accepted, and a rejection message is created at operation 62. On the other hand, if UAV 12 is available and ready, an acceptance message is created at operation 64. Either acknowledgement is forwarded back to UIA core 28 at operation 65. UIA core 28 then sends the acknowledgement to GIG publication manager 34 at operation 66. The acknowledgement is subsequently published for GIG 20 for the user or command personnel at operation 67.

Turning now to FIG. 5, a Sensor Request sub-chart for the command process flowchart of FIG. 3 is illustrated. Once the Sensor Request query returns a positive result at internal command query 46 (see FIG. 3), the data for the sensor request is extracted from UCDO 40 at operation 68. The request is first validated at operation 70. If the request is found invalid (for example, the request was improperly formatted or unclearly transmitted), a sensor request error message is created at operation 72. This result is then forwarded back to UIA core 28 at operation 74. UIA core 28 forwards this acknowledgement to GIG publication manager 34 of GIG interface 26 at operation 75. GIG publication manager 34 then publishes the acknowledgement to GIG 20 at operation 77. If the request is valid, then the sensor request is created in the native format of the relevant UAV(s) 12, 14, 16 (see FIGS. 1, 2), as shown at operation 76, and sent to the platform mission execution system(s) of the relevant UAV(s) 12, 14, 16 (FIGS. 1, 2) as shown at operation 78. The acceptance of the request is then verified at operation 80, forwarding either a request rejection message (if the UAV(s) 12, 14, 16 (FIGS. 1, 2) are inoperable or otherwise unavailable) at operation 82 or a request accepted message at operation 84. This result acknowledgement is then published on GIG 20 as described above for the request invalidity message.

Turning now to FIG. 6, an Image Request sub-chart for the command process flowchart of FIG. 3 is shown. Once the Image Request query returns a positive result at internal command query 46 (see FIG. 3), an extract image data request common object is created and sent to platform module 30. Operation 85 extracts several parameters of data from the extract image data request common object. Operation 86 subsequently queries whether the request is valid (i.e., whether the relevant UAV has the requisite image capability). If the request is invalid, an invalid image request error message is created at operation 88, which is sent to UIA core 28 at operation 90. UIA core 28 forwards this error message to GIG publication manager 34 at operation 92, which sends the error message to GIG 20 at operation 94. If, on the other hand, the request is valid, platform module 30 next queries whether the image target is within range of the relevant UAV platform at operation 96. If not, a Target Out Of Range message is created at operation 98 and forwarded to GIG 20 in the same manner as the invalid image request message described above. If the target is determined to be in range, an image request is created in the native format of the relevant UAV platform at operation 100. This image request is forwarded on to the platform mission execution system(s) of the relevant UAV(s) 12, 14, 16 (see FIGS. 1, 2) at operation 102. Operation 104 then queries whether the request is accepted by the relevant UAV. If not, an image request rejection message is created at operation 106 and forwarded back to GIG 20 in the same manner as the invalid image request message. If instead the image request is accepted, an image acceptance message is created at operation 108, and forwarded to GIG 20 in the same manner as the other data described in this paragraph.

Turning now to FIG. 7, a Drop Weapon Request sub-chart for the command process flowchart of FIG. 3 is shown. Once the Drop Weapon Request query returns a positive result at internal command query 46 (see FIG. 3), a Drop Weapon Request common object is created and sent to platform module 30. Once platform module 30 receives the common object, the target data is extracted from the common object at operation 110. An authorization query is made at operation 112, which checks the common object for proper security protocols. If the common object fails this query, an unauthorized error message is created at operation 114 and sent to UIA core 28 at operation 116. UIA core 28 forwards a result acknowledgement to GIG publication manager 34 at operation 118, and GIG publication manager 34 subsequently publishes a Drop Weapon request result to GIG 20 at operation 120. If the Drop Weapon common object meets security protocol, on the other hand, a weapon type validity query is next performed on the Drop Weapon common object at operation 121. A negative result forces a weapon invalid type error message at operation 122, which is forwarded to GIG 20 in the manner described above regarding the authorization query. A positive reply results in a weapons remaining query at operation 124, which checks the inventory of the relevant UAV(s) 12, 14, 16 (see FIGS. 1, 2) for the proper number of weapons requested. A negative result creates a Weapon Not Available error message at operation 126, which is published to GIG 20 in the same manner as the other drop weapon messages discussed above. A positive reply results in a Target Within Range query at operation 128. A negative result for this query results in the creation of a Target Out Of Range error message at operation 130, which is published to GIG 20 in the same manner as the other drop weapon messages discussed above. A positive result forces a Weapon Drop Request created in the UAV platform-specific format at operation 132, which is forwarded to the platform mission execution system(s) of the relevant UAV(s) 12, 14, 16 (FIGS. 1, 2) at operation 134. A request acceptance query is then performed at operation 135. If the request is accepted by the relevant UAV(s) 12, 14, 16 (FIGS. 1, 2), a Drop Weapon Request acceptance message is created at operation 136, and forwarded back to GIG 20. If the request is rejected (i.e., malfunction or other inability of UAV(s) 12, 14, 16 (FIGS. 1, 2) to complete the requested command), a Drop Weapon Request Rejected message is created at operation 138, which is published to GIG 20 is the manner described above.

Turning now to FIG. 8, a Video Request sub-chart for the command process flowchart of FIG. 3 is shown. Once the Video Request query returns a positive result at internal command query 46 (see FIG. 3), a Video Request common object is created and sent to platform module 30. Once platform module 30 receives the common object, the video request data is extracted from the common object at operation 140. A video capability query is made at operation 142 that checks the video capability of the relevant UAV(s) 12, 14, 16 (see FIGS. 1, 2) and compares with the common object data. If the common object fails this query, a No Video error message is created at operation 144 and sent to UIA core 28 at operation 146. UIA core 28 forwards a result acknowledgement to GIG publication manager 34 at operation 148, and GIG publication manager 34 subsequently sends a video request result to GIG 20 at operation 150. If the requested video capability is available, on the other hand, a Video Target Range query is next performed on the Video Request common object at operation 151. A negative result forces a Video Target Not Reachable error message at operation 152, which is forwarded to GIG 20 in the manner described above regarding the video availability query. A positive result forces a video request to be created in the UAV platform-specific format at operation 154, which is forwarded to the platform mission execution system(s) of the relevant UAV(s) 12, 14, 16 (FIGS. 1, 2) at operation 156. A request acceptance query is then performed at operation 157. If the request is accepted by the relevant UAV(s) 12, 14, 16 (FIGS. 1, 2), a Video Request acceptance message is created at operation 158, and forwarded back to GIG 20. If the request is rejected (i.e., malfunction or other inability of UAV(s) 12, 14, 16 (FIGS. 1, 2) to complete the requested command), a Video Request Rejected message is created at operation 160 that is forwarded to GIG 20 in the manner described above.

Turning now to FIG. 9, a Jammer Request sub-chart for the command process flowchart of FIG. 3 is shown. Once the Jammer Request query returns a positive result at internal command query 46 (see FIG. 3), a Jammer Request common object is created and sent to platform module 30. Once platform module 30 receives the common object, the jammer request data is extracted from the common object at operation 162. An authorization query is made at operation 164 that checks the common object for proper security protocols. If the common object fails this query, an unauthorized error message is created at operation 166, and sent to UIA core 28 at operation 168. UIA core 28 forwards a result acknowledgement to GIG publication manager 34 at operation 170, and GIG publication manager 34 subsequently sends a Jammer Request result to GIG 20 at operation 172. If the Jammer Request common object meets security protocol, on the other hand, a jammer capability query is next performed on the Jammer Request common object at operation 173. A negative result (i.e., no jammer capability is available from the relevant UAV(s) 12, 14, 16 (see FIGS. 1, 2)) forces a Jammer Capability Not Available error message at operation 174, which is forwarded to GIG 20 in the manner described above regarding the jammer authorization query. A positive result forces a Jammer Request to be created in the UAV platform-specific format at operation 176. A time period for the jammer is set at operation 178, depending on the data extracted from the Jammer Request common object. The jammer request is then forwarded to the platform mission execution system(s) of the relevant UAV(s) 12, 14, 16 (FIGS. 1, 2) at operation 180. A request acceptance query is then forced at operation 182. If the request is accepted by the relevant UAV, a Jammer Request Acceptance message is created at operation 186, and forwarded back to GIG 20. If the request is rejected (i.e., malfunction or other inability of UAV to complete the requested command), a Jammer Request Rejected message is created at operation 184, which is published to GIG 20 in the manner described above.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A method for communicating with a plurality of mobile platforms having different communication languages, comprising:
    using a control device to receive a command and data from a user;
    using the control device to generate a first packet of common language information relating to the command;
    sending said first packet of common language information to a translating subsystem;
    said first packet of common language information including a common language command and common language data; and
    using said translating subsystem to convert said first packet of said common language command and said common language data to a first packet of mobile platform specific information, said first packet of mobile platform specific information being understandable by at least one of the plurality of mobile platforms.

2. The method of claim 1, further comprising sending said first packet of mobile platform specific information to said at least one mobile platform.

3. A method for communicating between a mobile platform and a control device, comprising:
    generating a first packet of mobile platform specific information at said mobile platform;
    sending said first packet of mobile platform specific information from said mobile platform to a translating subsystem;
    using said translating subsystem to convert said first packet of mobile platform specific information to a second packet of common language information understandable by said control device, said common language information including a common language command and common language data;
    using a publication manager of the translating subsystem to publish the second packet of common language information to said control device via a Global Information Grid (GIG);
    sending said second packet of common language information from said GIG to said control device;
    using the control device to receive a new command from a user;
    using the control device to generate a third packet of common language information relating to the new command;
    using the GIG to send said third packet of common language information to a subscription manager of said translating subsystem;
    using said translating subsystem to translate said third packet of common language information to a fourth packet of mobile platform specific information; and using said publication manager of said translating subsystem to transmit said fourth packet of mobile platform specific information to said mobile platform.

4. The method of claim 3, wherein said generating a first packet of mobile platform specific information comprises generating a mobile platform specific data object.

5. The method of claim 3, wherein said fourth packet of mobile platform specific information instructs said mobile platform to travel to a predetermined location.

6. The method of claim 3, wherein generating said first packet of mobile platform specific information comprises generating sensor data collected by said mobile platform.

7. The method of claim 3, further comprising using said control device to generate an initial packet of mobile platform specific information that instructs said mobile platform to send said first packet of mobile platform specific information to said translating subsystem via said GIG, said first packet of mobile platform specific information comprising image data collected by said mobile platform.

8. The method of claim 3, further comprising using said mobile platform to receive said fourth packet of mobile platform specific information, said fourth packet of mobile platform specific information instructing said mobile platform to transmit video data collected by said mobile platform back to said translating subsystem.

9. The method of claim 3, further comprising using said control device to generate an initial packet of mobile platform specific information that instructs said mobile platform to initiate an electromagnetic jamming signal from said mobile platform.

10. A method for enabling bi-directional communication between a user and a plurality of mobile platforms operating with differing communication languages, the method comprising:
   using a control device to receive a command intended for use with a specific one of the mobile platforms;
   using the control device to receive the command and to generate in response thereto a first packet of common language information, the common language information including a common language command and common language data, both of the common language command and the common language data relating to the command, the command being specifically tailored for use with the specific mobile platform;
   using a translating subsystem to convert said first packet of common language information, which includes said common language command and said common language data, to a first packet of mobile platform specific information understandable by said specific mobile platform;
   causing said specific mobile platform to generate a second packet of mobile platform specific information; and
   using said translating subsystem to receive said second packet of mobile platform specific information and to generate a second packet of common language information therefrom that is understandable by said control device.

11. The method of claim 10, wherein said first packet of mobile platform specific information instructs said specific mobile platform to travel to a predetermined location.

12. The method of claim 10, wherein said first packet of mobile platform specific information instructs said specific mobile platform to send said second packet of mobile platform specific information to said translating subsystem, said second packet of mobile platform specific information comprising sensor data collected by said specific mobile platform.

13. The method of claim 10, wherein said first packet of mobile platform specific information instructs said specific mobile platform to send said second packet of mobile platform specific information to said translating subsystem, said second packet of mobile platform specific information comprising image data collected by said specific mobile platform.

14. The method of claim 10, wherein said first packet of mobile platform specific information instructs said specific mobile platform to deploy a weapon carried by said specific mobile platform.

15. The method of claim 10, wherein said first packet of mobile platform specific information instructs said specific mobile platform to send said second packet of mobile platform specific information to said translating subsystem, said second packet of mobile platform specific information comprising video data collected by said specific mobile platform.

16. The method of claim 10, wherein said first packet of mobile platform specific information instructs said specific mobile platform to initiate an electromagnetic jamming signal from said specific mobile platform.

17. A system for enabling communication between a user and a plurality of mobile platforms operating with differing communication languages, the system comprising:
   a control device adapted to receive a command and data from a user that is intended for use with a specific one of the mobile platforms, and to generate a first packet of common language information relating to the command and the data, the first packet of common language information including a first common language command and a first quantity of common language data;
   an information network interface in communication with a universal information network at one of a plurality of connection points associated with said universal information network, said universal information network adapted for transmitting the first packet of common language information from the user to said information network interface;
   a translating subsystem in communication with said information network interface, said translating subsystem adapted for translating said first packet of common language information into a first packet of mobile platform specific information understandable by said specific mobile platform;
   a mobile platform communication module in communication with said translating subsystem and said specific mobile platform, said mobile platform communication module being adapted for transmitting said first packet of mobile platform specific information to said specific mobile platform; and
   the translating subsystem further being adapted to receive a second packet of mobile platform specific information from said specific mobile platform and to translate said second packet of mobile platform specific information into a second packet of common language information useable by said user, said second packet of common language information including a second common language command and a second quantity of common language data.

18. The method of claim 1, wherein the mobile platform receives said first packet of mobile platform specific information.

19. The method of claim 3, further comprising using the mobile platform to receive the fourth packet of mobile platform specific information.

* * * * *

UNITED STATES PATENT AND TRADEMARK OFFICE
CERTIFICATE OF CORRECTION

PATENT NO. : 8,918,540 B2  Page 1 of 1
APPLICATION NO. : 11/235626
DATED : December 23, 2014
INVENTOR(S) : Corman et al.

It is certified that error appears in the above-identified patent and that said Letters Patent is hereby corrected as shown below:

In the Specification

Column 2, Line 16, please insert --FIG. 2 is a schematic diagram of the system of FIG. 1 being used to form a return/data link for a UAV communication system;--.

Signed and Sealed this
Nineteenth Day of May, 2015

Michelle K. Lee
*Director of the United States Patent and Trademark Office*